US008689344B2

(12) United States Patent
Court

(10) Patent No.: US 8,689,344 B2
(45) Date of Patent: Apr. 1, 2014

(54) SYSTEM AND METHOD OF INTEGRATING MODULES FOR EXECUTION ON A COMPUTING DEVICE AND CONTROLLING DURING RUNTIME AN ABILITY OF A FIRST MODULE TO ACCESS A SERVICE PROVIDED BY A SECOND MODULE

(75) Inventor: Gary Court, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 277 days.

(21) Appl. No.: 13/108,167

(22) Filed: May 16, 2011

(65) Prior Publication Data
US 2012/0297492 A1 Nov. 22, 2012

(51) Int. Cl.
*H04L 29/06* (2006.01)
(52) U.S. Cl.
USPC ............... 726/26; 726/2; 726/27; 726/29
(58) Field of Classification Search
USPC ................................... 726/22, 26, 27
See application file for complete search history.

(56) References Cited

U.S. PATENT DOCUMENTS

| 6,775,668 B1* | 8/2004 | Goel ........................... 1/1 |
| 2008/0134310 A1* | 6/2008 | Borde et al. ................ 726/7 |
| 2010/0105332 A1* | 4/2010 | McHenry et al. .......... 455/62 |
| 2011/0202902 A1* | 8/2011 | Whelan ..................... 717/126 |
| 2012/0036220 A1* | 2/2012 | Dare et al. .................. 709/217 |
| 2012/0204250 A1* | 8/2012 | Anderson et al. ............. 726/9 |

OTHER PUBLICATIONS

Google-Caja, "A source-to-source translator for securing Javascript-based web content", http://code.google.com/p/google-caja/, downloaded Nov. 15, 2010.
Adsafe, "Making JavaScript Safe for Advertising", http://www.adsafe.org/, downloaded Nov. 15, 2010.
Wikipedia, "Capability-based security", http://en.wikipedia.org/wiki/Capability-based_security, downloaded Nov. 15, 2010.
Wikipedia, "Object-capability model", http://en.wikipedia.org/wiki/Object-capability_model downloaded Nov. 15, 2010.

* cited by examiner

*Primary Examiner* — Mohammad L Rahman
(74) *Attorney, Agent, or Firm* — Andrew T. MacMillan

(57) ABSTRACT

A system for integrating modules of computer code may include a sandbox validator for receiving a first module and verifying that the first module complies with one or more sandbox constraints. A computing device may execute the first module within a runtime environment. A module integrator may operate within the runtime environment for receiving a request from the first module to access a service provided by a second module and only allowing the first module to access the service when the first module is authorized to access the service according to a service authorization table. The sandbox validator may ensure the first module correctly identifies itself when requesting a service provide by another module and that the first module includes runtime policing functions for non-deterministic operations. A service authorizer may generate an authorization policy for the first module, which is sent to the computing device along with the first module.

18 Claims, 10 Drawing Sheets

| | White list |
|---|---|
| 1 | Read / execute-only access to global variables of any of the following types:<br>    Math<br>    Array<br>    Boolean<br>    Number<br>    String<br>    RegExp<br>    Date |
| 2 | [ ] subscript operators when the subscript is a positive numeric literal or string literal |

FIG. 2

| | Black list |
|---|---|
| 1 | Access to global variables |
| 2 | The `eval` function and `with` statement |
| 3 | The use of any of the following names as properties:<br>`arguments`<br>`callee`<br>`caller`<br>`constructor`<br>`eval`<br>`prototype`<br>`stack`<br>`unwatch`<br>`valueOf`<br>`watch` |
| 4 | Property names that start or end with _ |
| 5 | [ ] subscript operators |

FIG. 3

| Non-deterministic list ||
|---|---|
| Non-deterministic language features | Ensure wrapped with policing function |
| this | check(this) |
| arguments | toArray(arguments) |
| Loops:<br>    for<br>    while | loopTimer({loop code}) |

FIG. 4

Service authorization table

| Module | Authorized service(s) |
|---|---|
| Hotel custom | • Post room charge<br>• VOD playback<br>• Lighting control |
| Video playback | • Post room charge |
| PMS billing | none |
| Room control | none |

FIG. 7

SYSTEM AND METHOD OF INTEGRATING MODULES FOR EXECUTION ON A COMPUTING DEVICE AND CONTROLLING DURING RUNTIME AN ABILITY OF A FIRST MODULE TO ACCESS A SERVICE PROVIDED BY A SECOND MODULE

BACKGROUND OF THE INVENTION

1. Field of the Invention

The invention pertains generally to integrating modules of computer code for execution on a computing device. More specifically, the invention relates to containing each module within a sandbox and controlling during runtime the ability of each module to access services provided by other modules.

2. Description of the Related Art

Hotels often purchase in-room entertainment and control systems from one or more outside vendors. Typically, a primary vendor handles the overall system and deals directly with the hotel owners while subcontracting various sub-portions to secondary vendors who may or may not have direct contact with the hotel owners. For example, a primary vendor may provide high speed Internet access (HSIA) and video-on-demand (VOD) servers and in-room set-top boxes (STBs) while subcontracting a secondary vendor to design an electronic control system for controlling various aspects of the guest rooms. The primary vendor and secondary vendor may work together to integrate their portions of the system such as to allow a guest to utilize a single infrared remote control device and an in-room television to browse the Internet, watch television (TV) and movies, and operate the in-room air-conditioner, lights, windows, and curtains.

After the system goes live, hotel management often desire to further customize and enhance the system. For example, management may wish to include a new feature unique to the hotel to distinguish the hotel from other hotels. In this situation, management typically contacts the primary vendor of the entertainment system to request incorporation of a special request or to add one or more new functions. Often the requested functions are very specific to the particular hotel and would not be useful or desirable to incorporate at other hotels. In addition to making direct changes to the system, the primary vendor may need to contact one or more secondary vendors if the requested feature involves interfacing with a secondary vendor's portion of the system.

It is inconvenient for hotel management to have to make these feature requests and to be limited to dealing only with the primary vendor. It would be beneficial if hotel management could simply make the changes to the system themselves such as by allowing a technical consultant or other third-party access to add a new feature to the installed entertainment system. It is likewise a financial and time burden on the primary and secondary vendors to handle these one-off feature requests for different hotels.

However, allowing the hotel or a third-party vendor to directly modify or add new features could cause stability problems since third-parties may not understand the system as whole. For example, in order to add a function to an in-room STB, a JavaScript program that controls the functions of the STB may need to be modified. Executing third-party JavaScript code on the in-room STB is risky both in terms of stability and security. Bugs may be inadvertently (or deliberately) introduced, and a malfunctioning third-party script has the potential to crash an in-room STB or interfere with the rest of the system. Security of guest data, hotel data, and media content is also a concern because each script running on the STB has unlimited access to the network and other valuable data within the STB. Content providers such as Hollywood studios have strict rules regarding encryption keys and content protection, and the primary system vendor must protect media assets such as pay-per-view and VOD content at all times. Giving untrusted third-party vendor code unlimited access to all functions of the STB is unacceptable under these rules.

Sandboxing is a well-known computer security technique utilized to isolate running computer programs from each other. Although JavaScript is a very insecure programming language, it is possible to "sandbox" a particular script by limiting the instructions and commands executable by the script according to the object-capability model. Generally speaking there are two approaches to using this capability-based security model to perform sandboxing on JavaScript: verification and translation.

The verification approach involves automatically checking before execution that a script is written entirely using a limited subset of the JavaScript language including only "safe" commands and language features that ensure the script is sandboxed. The original script is not changed at all during the verification process so verified scripts run at their native speed and with exactly their intended behavior. Only scripts that first pass the verification process are ensured to be isolated within their own sandbox and are allowed to be run. Scripts including one or more unsafe commands that could be used to act on or modify any information outside the sandbox fail the verification and cannot be run. ADsafe™ is an example of a nondestructive JavaScript verification tool that can be utilized to verify that a script is sandboxed at any stage of the deployment pipeline or after delivery as part of compliance testing.

The translation approach involves automatically translating a potentially unsafe original script file into a translated script file, which utilizes only code and language features that can be guaranteed at runtime to stay within the confines of a given set of sandbox rules. The Google™ Caja project is an example of a source-to-source JavaScript translator for securing JavaScript-based web content using this type of translation approach. Caja provides a compiler called a "cajoler" that generates a "cajoled" web application from a fail-stop subset of JavaScript that includes almost the entire JavaScript language except for a few error-prone constructs. Caja further allows for a wide range of flexible security policies including allowing a containing page to grant authority for an embedded application to access a particular web service.

Although the above verification and translation approaches are both viable options for including active content from untrusted third-parties into regular web sites, neither is optimal in an embedded environment such when running scripts on a STB in a hotel entertainment system. Due to limiting each script to its own sandbox, the verification approach impedes sharing functionality and information between scripts provided by different vendors. In this way, the verification approach is useful for inserting standalone active content such as advertisements or independent features that are not closely integrated with the existing system; however, hotel management may wish to add a new script to provide a feature on the STB that requires close integration with data and/or services provided by code already existing on the STB. Caja allows granting and denying authority to web services by passing and denying access to objects; however, a downside is the significantly increased length of the cajoled (i.e., translated) web applications and the resulting computational power requirements by devices executing the cajoled scripts. Caja is designed for web browsers running on modern personal computers, which may be orders of magnitude faster than a STB or other in-room embedded device typical found in a hotel entertainment system. In addition to running slower, the translated script file may also have new bugs or unexpected behaviors introduced by the Caja translation process itself, which further complicates testing and quality assurance efforts.

SUMMARY OF THE INVENTION

According to one aspect of the invention, there is disclosed a system for integrating a plurality of modules of computer code. The system includes a sandbox validator for receiving a first module and verifying that the first module complies with one or more sandbox constraints. A computing device executes the first module within a runtime environment. A module integrator operating within the runtime environment is configured for receiving a request from the first module to access a service provided by a second module, allowing the first module to access the service when the first module is authorized to access the service according to a service authorization table, and preventing the first module from accessing the service when the first module is not authorized to access the service according to the service authorization table.

According to another aspect of the invention, there is disclosed a method of integrating a plurality of modules of computer code. The method includes receiving a first module at a sandbox validator, and verifying, by the sandbox validator, that the first module complies with one or more sandbox constraints. The first module is executed within a runtime environment on a computing device. A request is received by a module integrator operating within the runtime environment, the request being from the first module to access a service provided by a second module. The first module is allowed by the module integrator to access the service when the first module is authorized to access the service according to a service authorization table. When the first module is not authorized to access the service according to the service authorization table, the module integrator prevents the first module from accessing the service.

According to yet another aspect of the invention, there is disclosed a system of integrating a plurality of modules of computer code. The system includes means for verifying that a first module complies with one or more sandbox constraints, means for executing the first module within a runtime environment, means for receiving a request from the first module to access a service provided by a second module, and means for only allowing the first module to access the service when the first module is authorized to access the service according to a service authorization table.

One advantageous use of the present invention is to allow third-party vendors to add advanced functionality to a hotel's entertainment system in a secure and safe manner. A further advantage is new computer code modules may be added with limited involvement of one or more vendors originally responsible for the system.

These and other embodiments and advantages of the embodiments of the present invention will become apparent from the following detailed description, taken in conjunction with the accompanying drawings, illustrating by way of example the principles of the invention.

BRIEF DESCRIPTION OF THE FIGURES

FIG. 2 shows an exemplary white list of FIG. 1 including allowed JavaScript operations and language features.

FIG. 3 shows an exemplary black list of FIG. 1 including operations and language features that are prohibited from use by vendor modules.

FIG. 4 illustrates an exemplary non-deterministic list of FIG. 1 including a list of non-deterministic operations and their appropriate policing functions.

FIG. 7 illustrates an example service authorization table that could be used to support the hotel custom module shown in FIG. 6.

DETAILED DESCRIPTION

Figure 1:
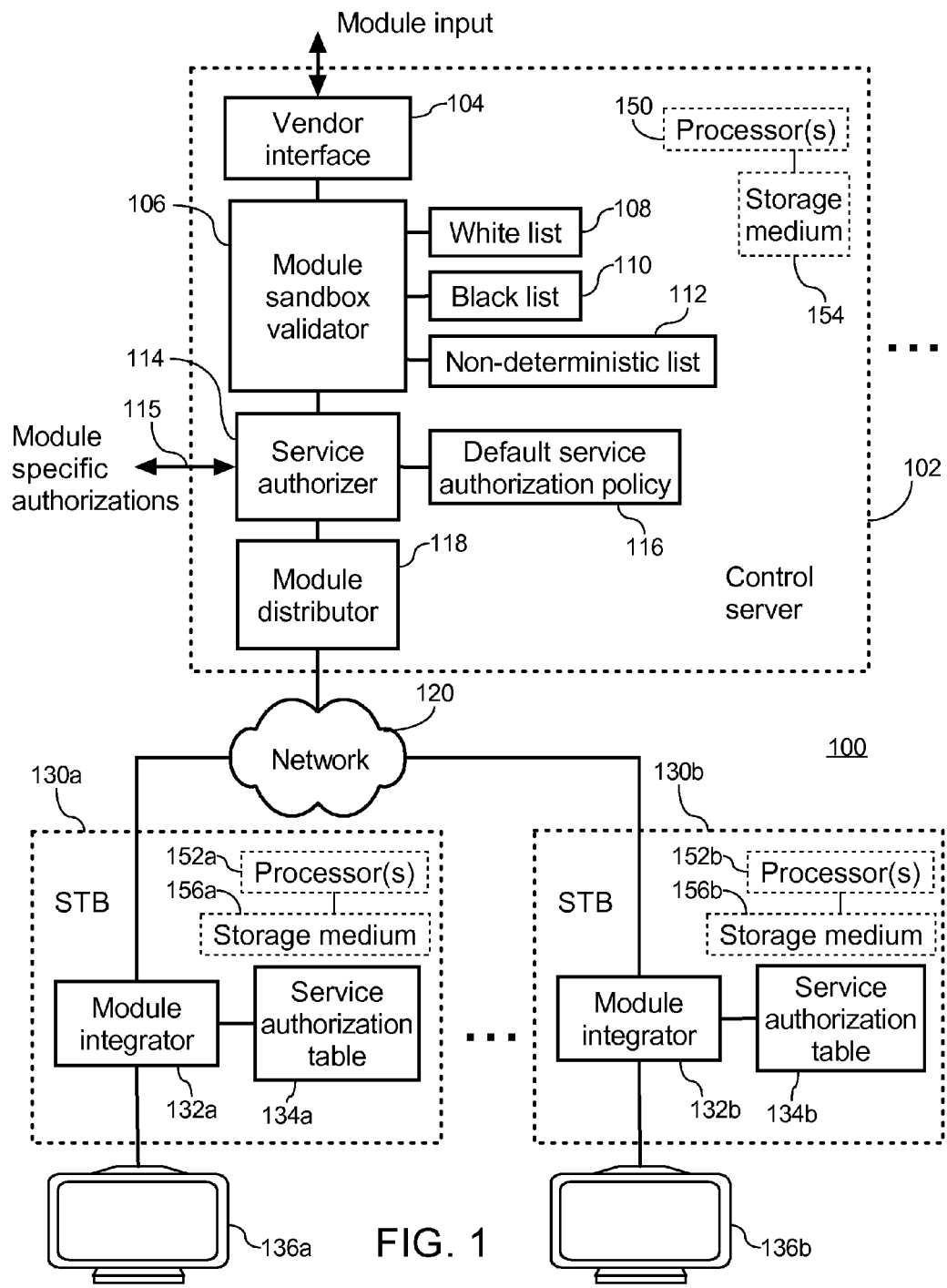
FIG. 1 illustrates a block diagram of a system for integrating a plurality of modules of computer code according to an exemplary configuration of the present invention.

FIG. 1 illustrates a block diagram of a system 100 for integrating a plurality of modules of computer code according to an exemplary configuration of the present invention. In this configuration, one or more control servers 102 are coupled via a network 120 to a plurality of computing devices such as set-top boxes (STBs) 130. Each STB 130 includes a web browser application operating within the STB for executing interpreted computer code such as JavaScript modules to provide hotel entertainment and control system functions to the guest. In one example, the control server 102 may be installed at the hotel and communicate with a plurality of STBs 130 installed in various guest rooms via the hotel's local area network (LAN) 120. In another example, the control server 102 may be installed at a central location such as an Internet connected data center and communicate with a plurality of STBs 130 installed in guest rooms in a plurality of hotels via network 120 formed by the Internet and/or hotel LANs. The control server 102 may validate a newly added vendor module, generate a service authorization policy for the new module, centrally store the module and service authorization policy, and distribute the module and its associated service authorization policy to the various STBs 130/hotels/other computing devices when required. As shown in FIG. 1, it is also possible to have more than one control server 102 each validating, authorizing, and/or distributing different modules.

In this configuration, the control server 102 includes a vendor interface unit 104, a module sandbox validator unit 106, a service authorizer unit 114, and a module distributor unit 118. Vendors utilize the vendor interface 104 to add their own modules to the system 100. To ensure security, the vendor interface 104 may require user authentication before allowing the vendor to add their code modules. Vendors may also utilize the vendor interface 104 to retrieve information regarding the status of their module(s) or to receive data returned from their module(s) such as from individual STBs 130. For example, some vendors may wish to implement interactive functions that will require the user to input data at the STB 130, which may be received by the vendor utilizing the vendor interface 104. Besides a physical console available to vendors, the vendor interface 104 may also be implemented in a virtual manner such as a web based portal or networked application programming interface (API) allowing vendors to remotely interact with the control server 102 through a computer network such as the Internet.

When an external vendor module is added, object capability restrictions are used to verify the code of the module is sandboxed and will not affect or access anything outside its sandbox except external services for which it requests access at runtime. In this configuration, these checks are done by the module sandbox validator 106 before the module code is sent to the STBs 130 for execution. A benefit of performing these checks in advance at a central control server 102 is that the burden on each STB 130 is reduced. The STBs 130 typically run an interpreted language such as JavaScript and have minimal system resources. This means there are no sandboxing capabilities built-in to each STB 130, and implementing a full sandbox in JavaScript or some other interpreted language on the STB 130 would run too slowly.

In this configuration, the sandbox validator 106 does not modify the code of the incoming vendor modules while performing the above mentioned checks. Instead, the module sandbox validator 106 verifies vendor modules comply with a set of sandbox constraints including a white list 108 of allowable JavaScript operations, a black list 110 of prohibited JavaScript operations, and a non-deterministic list 112 of JavaScript operations that may be permitted but cannot be determined safe before runtime. Each line of module code may be parsed to ensure that only an approved subset of language constructs are utilized. The three lists 108, 110, 112 may be predefined and published in advanced so the external vendors know to use the approved commands and not prohibited commands. For example, FIG. 2 shows an exemplary white list 108 including allowed JavaScript operations and language features, FIG. 3 shows an exemplary black list 110 including operations and language features that are prohibited from use by vendor modules, and FIG. 4 illustrates an exemplary non-deterministic list 112 including a list of non-deterministic operations and their required runtime policing functions.

Because the lists 108, 110, 112 may be provided to the vendor in advance, if the full computer language provides many ways to perform a desired task, the vendor will choose an implementation technique using the approved sub-set of the language in compliance with the lists 108, 110, 112. This avoids the inefficiencies caused by computer translation such as when an automatic translator takes unsafe but efficient code and translates it into safe but inefficient code.

The approved subset of operations may not include all the capabilities of the full language. For example, a "reboot STB" operation may not be allowed to be performed by a particular external vendor module whereas a "print text on screen" operation may be allowed. When a forbidden operation or command is encountered, the sandbox validator 106 may return an error with debug information to the external vendor via the vendor interface 104 so they can fix the problem. This information could be displayed in real time as a part of the interface 104 that the vendors use to submit their code, or could be done at a later time and then passed back to the vendor such as via email or allowing the vendor to log in to a web site acting as the vendor interface 104 to see the results.

The module sandbox validator 106 may also ensure that non-deterministic operations included on the non-deterministic list 112 are wrapped within an appropriate policing function. The policing functions are provided by the module integrator 132 during execution and confirm non-deterministic operations behave in a way that is compliant with the sandbox rules for the module.

In the example shown in FIG. 4, the special JavaScript variables this and arguments must be wrapped with policing functions as check(this) and toArray(arguments), respectively. The check function is provided by the module integrator 132 to confirm at runtime that the variable this is not the global object having global scope; if it is, the check function throws an error and prevents the module from performing that operation. The reason for this policing function is to prevent the special variable this from being utilized to access information outside the scope of the module sandbox. Similarly, the toArray function converts the special arguments variable into a simple array only including the parameters that were passed as arguments and none of the other information that is normally also included in the arguments variable. This ensures a module cannot access information from outside its scope that was not deliberately passed to the module. Additionally, loops are wrapped by a loopTimer function to prevent infinite (and long duration) loops by timing the duration of the loop and aborting the loop if the time exceeds a predetermined duration.

In this configuration, the module undergoing validation is not modified by the sandbox validator 106. Therefore, the vendor must ensure the proper policing functions (e.g., check, toArray, loopTimer) are utilized and the validator 106 simply verifies the functions are in place according to the non-deterministic list 112. One benefit of having the vendor include the policing functions in the module rather than having the sandbox validator 106 automatically add them is that successfully validated modules will not have been modified by the sandbox validator 106. The code for the policing function can be made available to the vendor, and, in this way, the vendor will be able to accurately test the module before integration with the system 100 because it includes the policing functions during both testing and deployment. In another configuration where this benefit is not required or as a backup in case the vendor forgets to add a particular policing function, the sandbox validator 106 may be configured to automatically modify the module to include the appropriate policing functions where needed.

It should be noted that the three policing functions (check, toArray, loopTimer) are described to show useful examples; however, the invention is not limited to only these three policing functions. Likewise, the white list 108 and black list 110 are not limited to only the approved and prohibited JavaScript language features shown, respectively. These lists 108, 110, 112 may be modified according to design requirements such as the computer language used to implement vendor modules. Additionally, the sandbox validator 106 may automatically utilize different lists 108, 110, 112 or automatically apply features on each list only to certain vendor modules such that some modules have tighter sandbox constraints than others. Modules names or other identifiers may be utilized by the sandbox validator 106 to determine the applicable sandbox constraints to validate for each module.

Ensuring each module correctly identifies itself when requesting access to services is another function of the module sandbox validator 106 in this example. As this function is closely related to runtime module integration, before understanding the significance of this verification, it is helpful to first understand how the module integrator 132 functions during execution on the STB 130 to permit and deny modules from accessing services provided by other modules. According to the present invention, modules may be authorized at runtime to access services provided by other modules. Services may be utilized to receive data from existing aspects of the hotel's entertainment system, to provide data to other parts of the system, to call functions and procedures (which are types of services) related to other modules, and/or to provide functions and procedures to the other modules. During module execution by the STB 130, a module may request access to one or more services provided by other modules on the STB 130. The access request may be performed by calling a runtime_integration service provided by the module integrator 132. Module integrator 132 either grants or denies the request according to a service authorization table 134. In one configuration, the request may be made at load time of the module by specifying the name of the requesting vendor module and the names of the desired external services as follows:

```
runtime_integration ("Module_Name",
 ["Requested_service_name_1"],
 ["Requested_service_name_2"], ...,
 function(Pointer_to_requested_service_1,
 Pointer_to_requeated_service_2, ...)
 { code }
``` where: runtime_integration is a service provider by the module integrator 132 utilized to provide execution pointers so modules can call services provided by other modules, Module_Name is the name of the current module (i.e., the module making the request), Requested_service_name_N are the names of the requested services as provided by other modules, Pointer_to_requested_service_N are pointers returned by the module integrator 132 being either a valid pointer to the execution addresses of the requested service when the module is authorized to access that service or an invalid pointer when the module is not authorized, and {code} is the JavaScript code of the vendor module being a series of operations executed as a function and utilizing the service pointers received from the module integrator 132.

In the code section, the module may also define one or more services that may be made available to other modules running on the STB 130 using a similar process. These vendor provided services may be registered with the module integrator 132 using a register_service function so that module integrator 132 will record the name of the service and a valid execution addresses in order to pass a pointer to other modules that are authorized to use this service. An example of registering a service with the module integrator 132 in JavaScript is as follows:
register_service("Service_name", {service_code})

where: register_service is the registration service provided by the module integrator 132, Service_name is the name of the service provided by the vendor module and that may be used by other modules if they are authorized according to the service authorization table 134, and service_code is the JavaScript code of the service. In this way, all modules may both request access to external services and provide services to other modules. The module integrator 132 utilizes the service authorization table 134 to determine which modules may access which services and then authorizes and denies access by passing valid and invalid pointers accordingly.

Returning again to the module sandbox validator unit 106, because different module names may be authorized to access different services, during module validation, the module sandbox validator 106 ensures that the Requesting_Module_Name correctly identifies the name of the module being validated. This may be done by either failing validation if the module reports another module's name or by inserting the module's correct name. In addition to module names, other types of module identifiers associated with the module may be used for this purpose, for example, unique serial numbers, module names or addresses, and/or vendor codes. The result is the sandbox validator 106 ensures the module does not forge another module's identifier in order to gain unauthorized access to one or more services at runtime.

Figure 5:
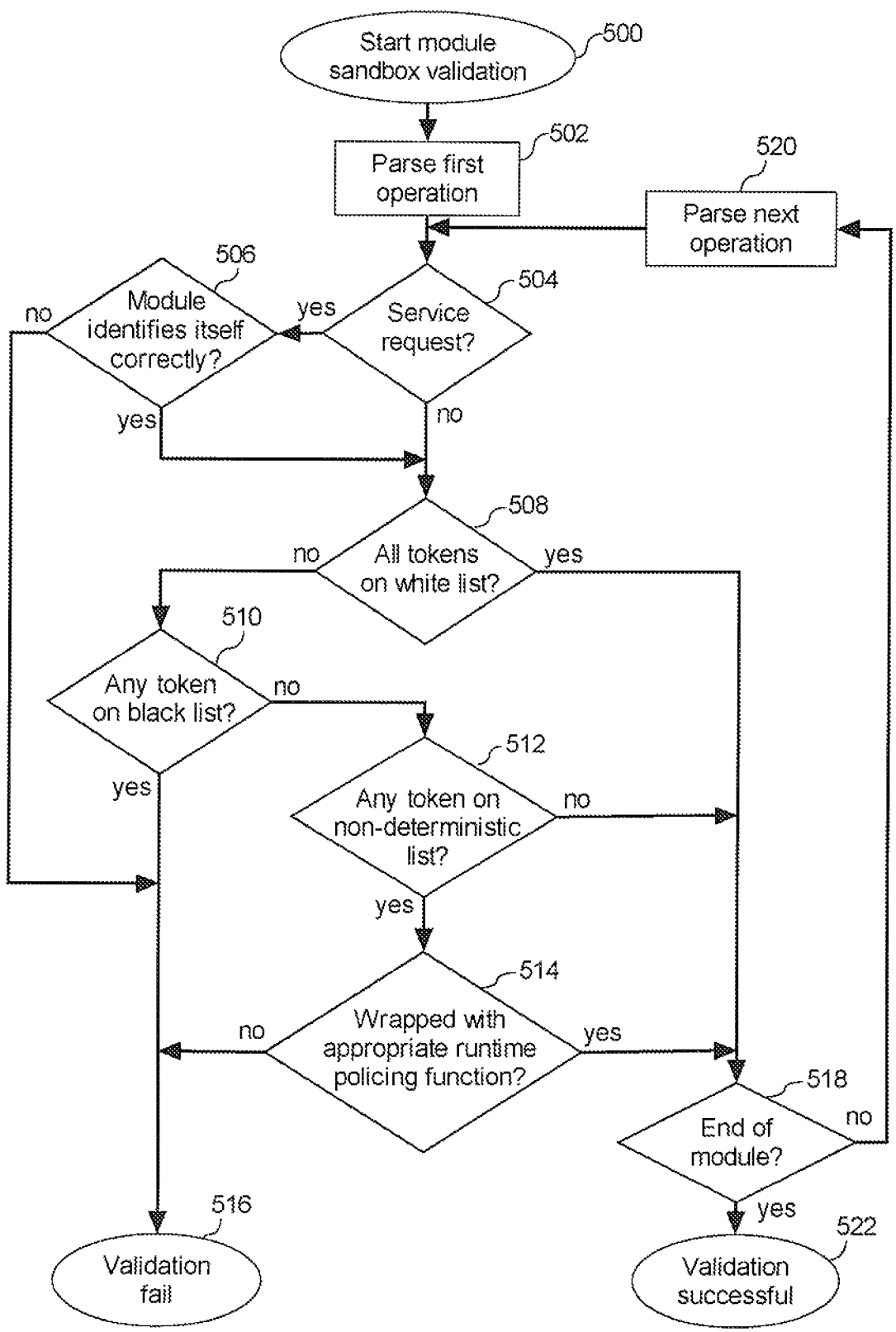
FIG. 5 is a flowchart of operations that may be performed by the sandbox validator of FIG. 1 to verify that a module complies with a set of sandbox constraints.

FIG. 5 is a flowchart of operations performed by the module sandbox validator unit 106 to verify that a module complies with a set of sandbox constraints defined by the white list 108, black list 110, and non-deterministic list 112 shown in FIG. 1 according to one exemplary configuration. The steps of the flowchart are not restricted to the exact order shown, and, in other configurations, shown steps may be omitted or other intermediate steps added. In this configuration, the module sandbox validator unit 106 performs the following operations:

Step 500: The module sandbox validation process begins when the sandbox validator 106 receives a new module. For example, this may occur when a hotel or third-party vendor submits a new JavaScript module file for execution on one or more STBs 130 using the vendor interface 104.

Step 502: The sandbox validator 106 automatically parses the first operation of the incoming module into one or more tokens. Tokens may be pieces of a command, the command itself, or properties of the commands such as whether it operates on global variables, forms a loop, uses a particular reserved word, etc. For example, all the various JavaScript language features included on the lists 108, 110, 112 of FIG. 2, FIG. 3, FIG. 4 are examples of tokens that may be detected at this step.

Step 504: Is the current operation attempting to request access to an external service? This may be determined if one of the tokens corresponds to a request to the runtime_integration service described above, for example. If yes, control proceeds to step 506; otherwise, control proceeds to step 508.

Step 506: When requesting access to the external service, does the module correctly identify itself to the runtime integration service? For example, does the Module_Name reported by the module when calling the runtime_integration service match the name of the module undergoing validation? If yes, control proceeds to step 508; otherwise, control proceeds directly to step 516 to fail validation and prevent the module from impersonating another module at runtime.

Step 508: Are all the tokens of the current operation on the white list 108? Specific matches of tokens on the white list 108 may correspond to exceptions of prohibited commands that are blocked by the black list 110. For example, FIG. 2 shows an example of a white list 108 utilized to allow deterministic and safe uses of JavaScript that cannot escape a module sandbox. If all tokens of the current operation are on the white list 108, control proceeds to step 518; otherwise, control proceeds to step 510.

Step 510: Are any tokens of the current operation on the black list 110? Matches in this step indicate prohibited language features and control proceeds directly to step 516 to fail the validation. For example, FIG. 3 shows an example of black list 110 utilized to prohibit unsafe uses of JavaScript that may be utilized to escape a module sandbox. When the current command does not correspond to any of the tokens listed on the black list 110, control proceeds to step 512.

Step 512: Are any tokens of the current operation on the non-deterministic list 112? The non-deterministic list 112 is utilized to detect commands that are permitted on the condition that they are wrapped with a runtime policing function because they may be unsafe or violate the module sandbox if used improperly and the only way to check them is at runtime. For example, FIG. 4 shows an example of the non-deterministic list 112 listing several non-deterministic tokens. If any token matches the non-deterministic list 112, control proceeds to step 514; otherwise, control proceeds to step 518.

Step 514: In order to ensure these non-deterministic operations are utilized properly, the sandbox validator 106 checks to see that the non-deterministic operation or token is wrapped with the appropriate runtime policing function. For example, FIG. 4 shows an example of non-deterministic list 112 showing non-deterministic JavaScript language features that are allowed as long as they are wrapped with the corresponding policing function. If the non-deterministic operations are properly wrapped with the corresponding policing function, control proceeds to step 518; otherwise, control proceeds to step 516 to fail the validation.

Step 516: Validation fails because the module does not comply with its sandbox constraints.

Step 518: Is the current operation the last command of the module? If yes, control proceeds to step 522; otherwise, control proceeds to step 520.

Step 520: The sandbox validator 106 automatically parses the next operation of the incoming module into one or more tokens and returns to step 504.

Step 522: Validation succeeds because all operations of the module comply with the sandbox constraints defined by the white, black, and non-deterministic lists 108, 110, 112 according to the name of the module undergoing validation.

Although in a preferred configuration the sandbox validator 106 does not modify the module code in any way so that validated modules run with exactly the same behavior and speed as they did during testing by the vendor, in another configuration, the validator may automatically modify the module code as required to enforce the above rules. For example, at step 506 the validator 106 may insert the module's correct identifier and in step 514 the module may wrap the non-deterministic operation with the required policing function.

The service authorizer 114 generates a service authorization policy for the vendor module according to either a default service authorization policy 116 and/or module specific authorizations 115 that may be received from an administrator for one or more specific modules. The service authorization policy specifies which external services the module is authorized to access during execution on one or more STBs 130.

An existing service provided at each STB 130 may provide the name of the guest currently staying in the associated hotel room, and, by default, all vendor modules may be authorized to access this service according to the default service authorization policy 116. The default service authorization policy 116 may contain a list of system-wide pre-authorized services applicable to all modules. In another example, the same on-screen user interface (UI) services may be authorized for all modules to allow a vendor module to position buttons and controls on the screen using the same UI skin (look and feel) as what the media system 100 currently uses. A hotel guest interacts with the STB 130 using a UI displayed on an in-room television 136 and controlled by an infrared remote control device. Guests operating each STB 130 may not even necessarily know that some functions were implemented by different vendor modules.

An administrator may also configure the service authorizer 114 to either deny a particular module from accessing one or more services on the default policy 116 or may further authorize a particular module to access one or more services other than those listed on the default policy 116. The service authorizer 114 may automatically generate a different service authorization policy for each vendor module according to the name or other identifier of the vendor module and module specific authorizations 115. Then, the module and its associated service authorization policy are passed to the module distributor 118 for distribution. An administrator may be presented with lists of the modules in the system 100 and services requested by a new vendor module in order to configure module specific authorizations 115. The service authorizer 114 may generate an updated service authorization policy for a module at any time. Upon receiving the updated service authorization policy, STBs 130 may update their service authorization tables 134 accordingly.

The module distributor 118 automatically transfers the module and its associated service authorization policy to one or more STBs 130 in the hotel. It is not necessary that all STBs 130 run the same modules; for instance, a first STB 130*a* may operate using a set of modules different than a second STB 130*b*. The module distributor 118 may be implemented as a web server from which the STBs 130 request and download a JavaScript program including a plurality of modules dynamically selected according to an identifier associated with the STB such as a room number. Alternatively, the module distributor 118 may push one or more modules and/or updated service authorization policies to one or more STBs 130.

Figure 6:
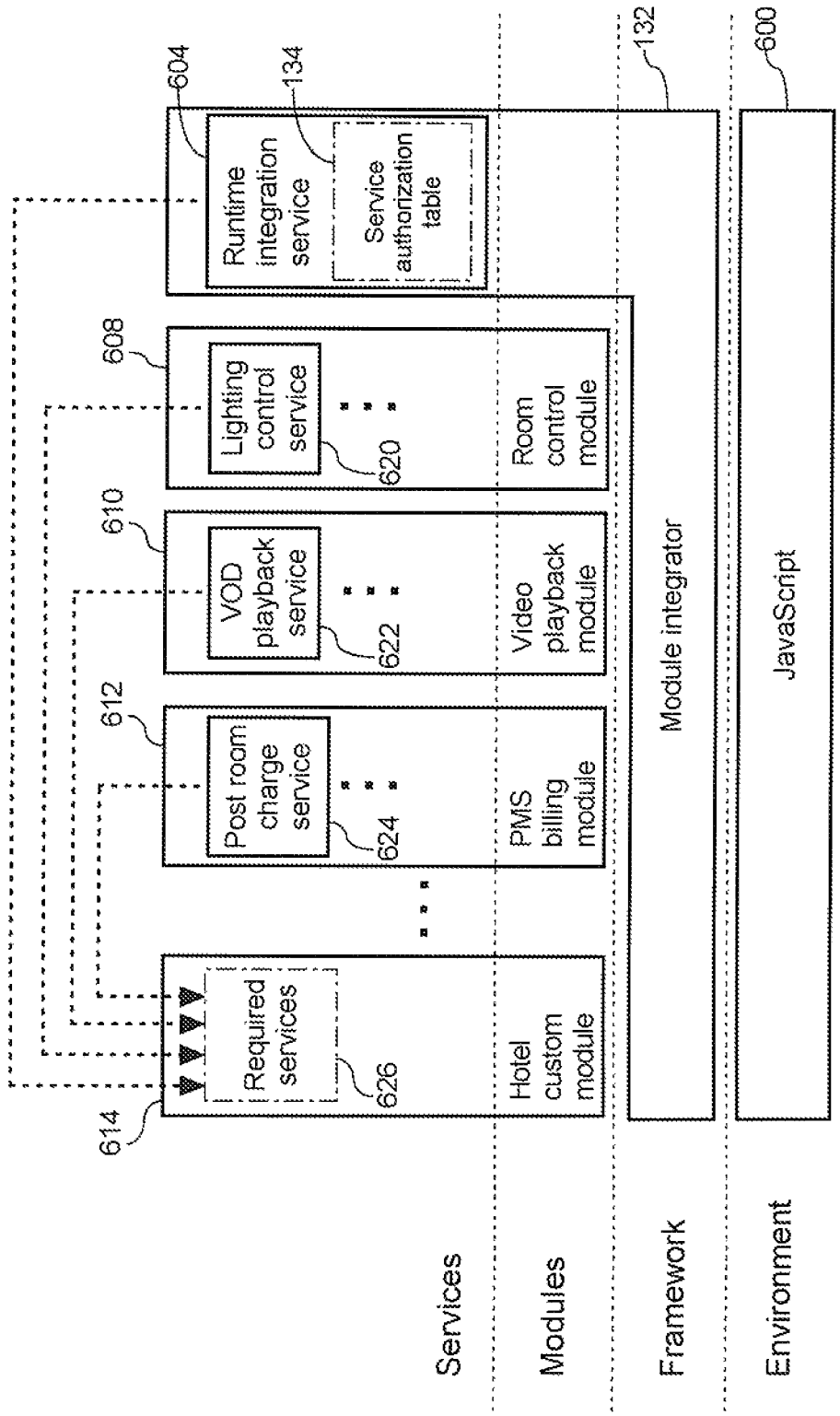
FIG. 6 illustrates an exemplary architectural view of execution layers running on a STB of FIG. 1.

FIG. 6 illustrates an exemplary architectural view of execution layers running on a STB 130. A first layer is formed by a regular JavaScript execution environment 600 such as may be provided within a web browser running on each STB 130. The module integrator 132 operates within the JavaScript environment 600 as the framework for performing runtime policing functions and controlling each module's ability to access services provided by other modules. In this configuration, the module integrator 132 is itself a module executed by the JavaScript environment 600 and provides the runtime integration service 604. The module integrator 132 may also provide other services (not shown) such as those required to run the various policing functions shown in FIG. 4 and a registration service allowing modules to offer to provide services to other modules, for example.

As explained earlier, the runtime integration service 604 authorizes the other modules 608, 610, 612, 614 to integrate their services according to a service authorization table 134. In this example, four modules 608, 610, 612, 614 are illustrated including a room control module 608 provided a lighting control service 620, a video playback module 610 providing a video-on-demand (VOD) playback service 620, a property management billing module 612 providing a post room charge service 624, and a hotel custom module 614. The hotel custom module 614 is the vendor module in this example and includes a list of required services 626 in the form of a request to the runtime integration service 604 to access externally provided services 624, 622, 620.

To help illustrate a beneficial usage of the present invention, in this example, the purpose of the hotel custom module 614 is to provide a feature movie experience as designed by hotel management. When a guest selects the feature movie on a menu displayed on the in-room television 136, the post room charge service 624 is utilized to automatically bill the guest by adding a charge to the room bill using the hotel's property management system (PMS), the VOD playback service 622 is utilized to automatically begin playback of the feature movie on the television 136, and the lighting control service 620 is utilized to automatically dim the room lights at the beginning of the movie and then automatically flash the lights for effect at particular times during the movie such as during explosions. As can be seen from this simplified example, besides the runtime integration service, the hotel custom module 614 needs to access at least three services 620, 622, 624 provided by other modules 608, 610, 612, respectively. The other modules 608, 610, 612 may be under the control of a different vendor or provider. Additionally, although not shown in FIG. 6, the hotel custom module 614 may also provide one or more services to other modules.

FIG. 7 illustrates an example service authorization table 134 that could be used to support the hotel custom module 614 shown in FIG. 6. The same service authorization table 134 may be present on all STBs 130 or different STBs 130a, 130b may have different service authorization tables 134a, 134b allowing modules access to different services. Different service authorization tables 134a, 134b may be automatically formed when the module distributor 118 sends different modules and service authorization policies to each STB 130 based on the type of hotel room such as standard, deluxe, penthouse, etc. In one configuration, each row of the service authorization table may correspond to that module's service authorization policy as generated by the service authorizer 114. In this example, if the module distributor 118 does not send the hotel custom module 614 to a STB 130, that STB 130 will not have the hotel custom module row in its service authorization table 134. When the module distributor 118 sends the hotel custom module 614 and its associated service authorization policy to a STB 130, that STB 130 will include row in the service authorization table 134.

Each module may be authorized to access any number of services provided by other modules. In the example illustrated in FIG. 7, the hotel custom module 614 is authorized to access the post room charge service 624, the VOD playback service 622, and the lightening control service 620. More than one module may be authorized to access a single service such as the post room charge service 624 being authorized for use by both the hotel custom module 614 and the video playback module 610. Additionally, some modules, for example, the PMS billing module 612 and the room control module 608 in this example, may not be authorized to access any external modules, although these modules 608, 612 may themselves provide services authorized to be accessed by other modules.

Figure 8:
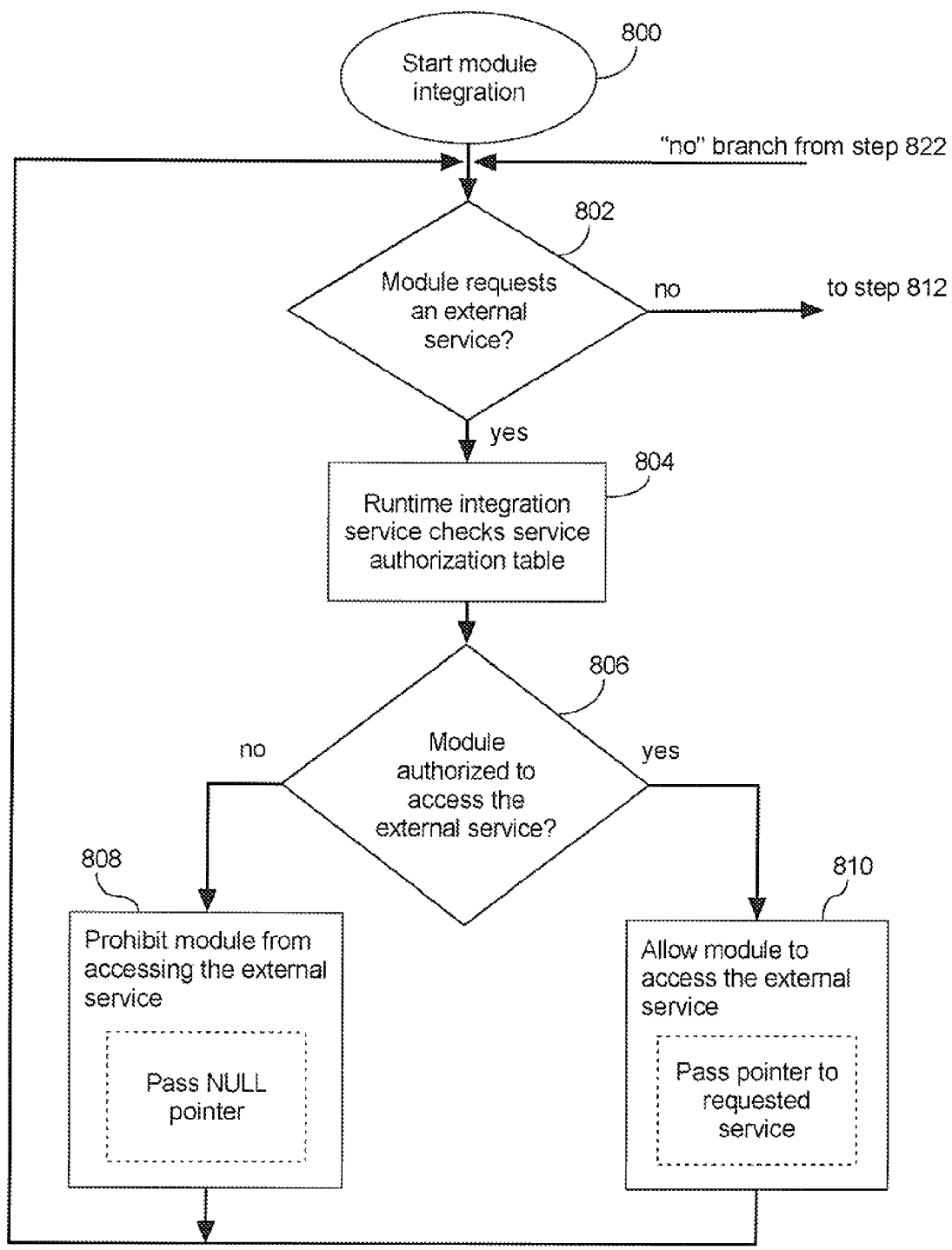
FIG. 8 and FIG. 9 together illustrate an exemplary operational flowchart of steps that may be performed by the module integrator of FIG. 1 at runtime to ensure the operations of a vendor module comply with the sandbox constrains and to control the ability of the module to access one or more services offered by other modules.
Figure 9:
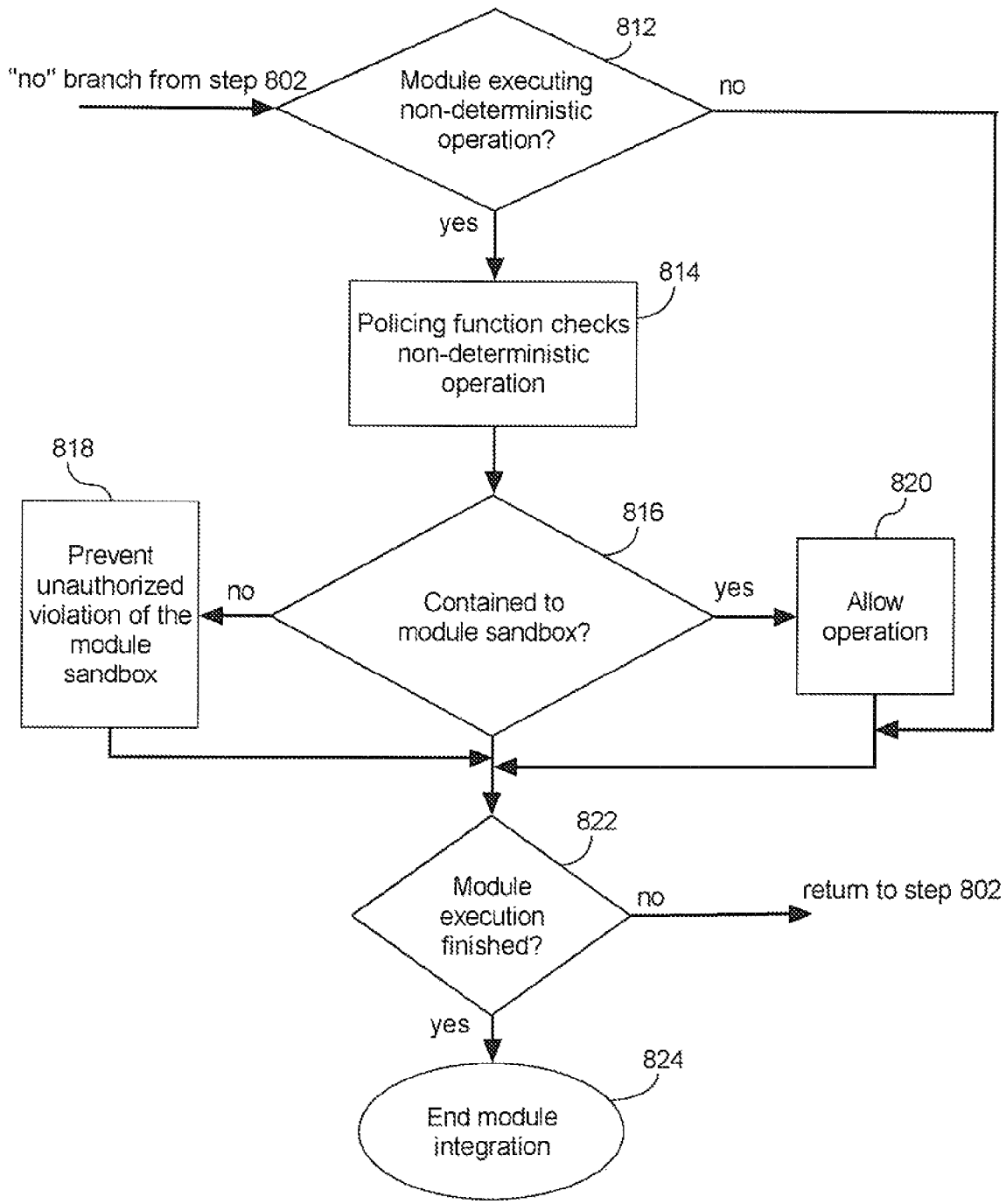

FIG. 8 and FIG. 9 together illustrate an exemplary operational flowchart of steps that may be performed by the module integrator 132 at runtime to ensure the operations of a vendor module comply with its sandbox constrains and to control the ability of the module to access one or more services offered by other modules. The steps of the flowchart are not restricted to the exact order shown, and, in other configurations, shown steps may be omitted or other intermediate steps added. In this configuration, the module integrator 132 operates within the runtime JavaScript environment 600 on each STB 130 and performs the following steps:

Step 800: Module integration may start upon loading a module for execution on the STB 130. In another configuration, module integration may occur and/or continue to occur while the modules are executing. For illustration purposes, in this flowchart description, the phrase "the module" generally refers to a vendor module, and "another module" generally refers to a module different from the vendor module. For example, to help understand the flowchart with reference to the example shown in FIG. 6 and FIG. 7, the hotel custom module 614 may be considered "the module" and the video playback module 610 may be considered "another module". However, it should be noted that the module integrator 132 may be simultaneously utilized with a plurality of different modules in order to ensure sandboxing and service authorizations are maintained for a plurality of modules. By handling external service access requests, service registrations, and policing functions, all of which were verified as being properly included in the code of the module by the module sandbox validator 106, the module integrator 132 is capable of dynamically controlling sandboxing and integration between any number of modules.

Step 802: Is the module requesting an external service? The phrase "external service" in this flowchart refers to a service such as a function or procedure provided by another module. For example, with reference to the dashed lines in FIG. 6, the hotel custom module 614 may include a request to the runtime integration service 604 identifying itself as the hotel custom module 614 and asking the runtime integration service 604 to return valid pointers for the post room charge service 624, VOD playback service 622, and lighting control service 620.

Step 804: The runtime integration service 604 receives the request from the module and checks the service authorization table 134 to see if the module is authorized to access the requested service.

Step 806: When the module is authorized to access the requested service according to the service authorization table 134, control proceeds to step 810; otherwise, control proceeds to step 808. As mentioned, because the sandbox validator 106 has previously ensured that the module has correctly identified itself each time it requests access to an external service, it is not possible that the module could forge another module's name in order to obtain greater access to external services.

Step 808: Because the module has requested access to a service for which it is not authorized, the runtime integration service 604 prevents the module from accessing the prohibited service by passing an invalid pointer such as NULL pointer as the execution address for the service.

Step 810: Because the module is authorized to access the requested service, the runtime integration service 604 allows the module to access the external service by passing a valid pointer to the service's execution address in the JavaScript environment 600.

Step 812: Is the module executing a non-deterministic operation wrapped with a policing function? If yes, control proceeds to step 814; otherwise, control proceeds to step 822. As mentioned, in a preferred configuration, the sandbox validator 106 has already ensured the module code includes the appropriate policing function; however, in another configuration the module integrator 132 may automatically detect non-deterministic operations and wrap them with the appropriate policing function, for example, in advance or in real-time.

Step 814: The policing function performs a runtime check to ensure the non-deterministic operation complies with the sandbox constraints.

Step 816: Is the non-deterministic operation contained to the module sandbox 816?

Step 818: The policing function prevents execution of the non-deterministic operation when the runtime check determines that the non-deterministic operation does not comply with the sandbox constraints.

Step 820: The policing function allows execution of the non-deterministic operation when the runtime check determines the non-deterministic operation complies with the sandbox constraints.

Step 822: Is the module execution finished? If yes, control proceeds to the step 824 to end module integration; otherwise, control returns to step 802.

Step 824: Module integration is finished.

At steps 812 to 820, in addition to functionality described for check, toArray, loopTimer illustrated in FIG. 4, the policing functions may involve code that will check at runtime that a vendor's particular operation will not modify or read any variables for which it is not allowed. For example, reading a location specified by a pointer may be a non-deterministic operation if the sandbox validator 106 is unable to determine to where the pointer will point before runtime. Therefore, the read operation may be wrapped with a policing function that will check where the pointer points at runtime before allowing the operation to actually be executed.

If the policing function finds that the operation will access only memory and variables created by the vendor module code then it will allow the operation to execute on the STB 130. Otherwise, it will halt the execution and branch control away from the vendor module. For example, the policing function may branch to a suitable error message to be displayed on the STB 130 at this point to help the external vendor debug the problem. Alternately, the policing function may branch to a section of code that returns status of the failed operation and any other debug information to the vendor via the hotel's network 120 and ultimately to the vendor interface 104. For example, the error message could be sent to the vendor interface 104 that vendors use to access information received from STBs 130. This way, the third-party vendors may collect bug information from all the STBs 130 throughout the hotel without having to physically go to the rooms to read error messages displayed by individual STBs 130 or to contact other vendors responsible for other portions of the entertainment system.

Figure 10:
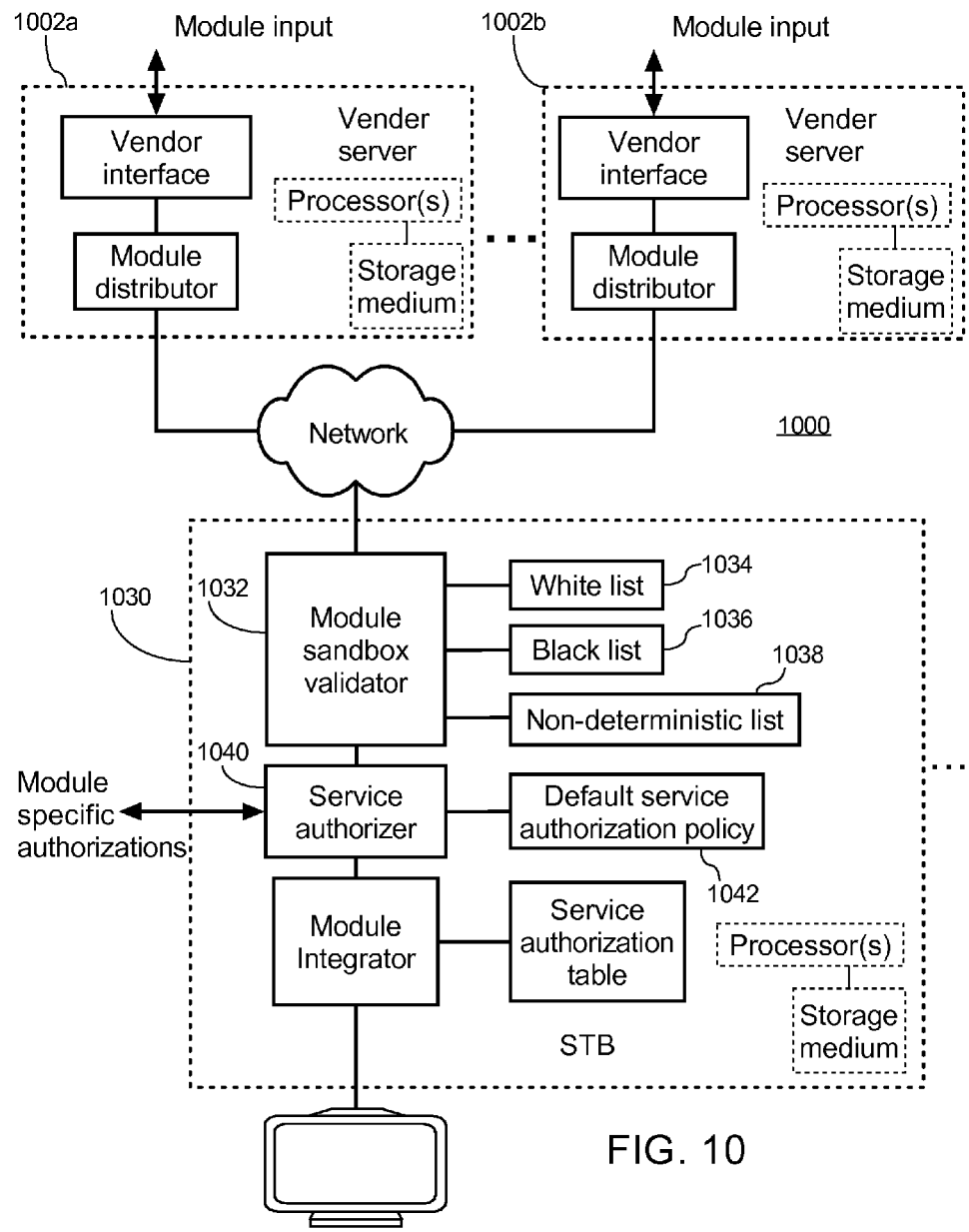
FIG. 10 illustrates a block diagram of a system for integrating a plurality of modules of computer code according to another exemplary configuration of the present invention.

FIG. 10 illustrates a block diagram of a system 1000 for integrating a plurality of modules of computer code according to another exemplary configuration of the present invention. Units having the same names as used in the example of FIG. 1 generally behave similar to as previously described for FIG. 1; however, the order and the location of the units are modified in FIG. 10. In system 1000, one or more vendor servers 1002 are coupled to each computing device, illustrated as STBs 1030 in this example. The vendor servers 1002 may be untrusted and therefore the module sandbox validator 1032, the related lists 1034, 1036, 1038, the service authorizer 1040, and the default service authorization policy 1042 are located at each STB 1030. Although, this increases the workload on each STB 130 and means that a single vendor module sent from a vendor server 1002 to a plurality of STB 130 will under go validation at each STB 130, this configuration may be advantageous, for example, when providing a distributed software-as-a-service (SaaS) architecture because no central control server 102 need be utilized.

One advantageous use of the present invention is to allow third-party vendors to add advanced functionality to a hotel's entertainment system in a secure and safe manner. The third-party vendors may be provided information on an allowed subset of the JavaScript language, required policing functions defined by the lists of FIG. 2, FIG. 3, and FIG. 4, and services available from other modules in the system. The third party module may include a request to access one or more services provided within the hotel entertainment system. A primary vendor responsible for the system as a whole may configure or customize a service authorization policy for the new module to allow it access to its required services and no other services. In this way, new computer code modules may be added with limited involvement of one or more vendors originally responsible for the system. Further, because the modules do not undergo inefficient translation process in one configuration, they continue to run at full speed and with their intended behavior.

In summary, a system for integrating modules of computer code may include a sandbox validator for receiving a first module and verifying that the first module complies with one or more sandbox constraints. A computing device may execute the first module within a runtime environment. A module integrator may operate within the runtime environment for receiving a request from the first module to access a service provided by a second module and only allowing the first module to access the service when the first module is authorized to access the service according to a service authorization table. The sandbox validator may ensure the first module correctly identifies itself when requesting a service provide by another module and that the first module includes runtime policing functions for non-deterministic operations. A service authorizer may generate an authorization policy for the first module, which is sent to the computing device along with the first module.

Although the invention has been described in connection with a preferred embodiment, it should be understood that various modifications, additions and alterations may be made to the invention by one skilled in the art without departing from the spirit and scope of the invention. For example, with reference to FIG. 1 and FIG. 10, although it is beneficial to locate the module sandbox validator unit 106, 1032 prior to the service authorizer unit 114, 1040 to avoid unnecessary processing by the service authorizer 114 should the module code fail validation, this is not a requirement and the order may be interchanged or performed in parallel. JavaScript has been utilized to illustrate one example of the invention; however, this is not a limitation and other languages may utilized to code the modules and the same principles of the invention apply in a similar manner. When describing how policing function are "wrapped" around non-deterministic operations, this language is also intended to include adding the policing functions either in advance by the module author or automatically by the sandbox validator and at any position in the vendor module to allow the required runtime check and error handling. Additionally, module storage (long term and temporary) may be included at any stage in the system 100, 1000 in order to store modules for later distribution and/or execution.

It should also be noted that in the above description illustrative words such as vendor, administrator, owner, hotel management, third-party, etc are simply meant as examples of different types of users to help provide an understanding of one beneficial application of the invention; however, in other applications, other types of users may equally apply. Examples of other applications include but are not limited to usage at hotels, motels, resorts, hospitals, apartment/townhouse complexes, restaurants, retirement centres, cruise ships, busses, airlines, shopping centres, passenger trains, etc. Although, particularly beneficial when integrating vendor modules authored by different entities, in practice all modules may be authored by a same entity. For example, a single corporation may utilize the invention to integrate modules all written in-house, in a safe and secure manner. STBs 130 are chosen as the computing device to help illustrate one beneficial usage of the present invention; however, the described technology is equally applicable to other types of computing devices. Examples of other types of computing devices include but are not limited to set-top boxes, televisions, displays, mobile phones, laptop computers, notebook computers, desktop computers, tablet computers, personal digital assistants (PDAs), embedded devices, etc.

The above description describes elements of a system 100, 1000 that may include one or more units, some of which are explicitly shown in the figures, others that are not. As used herein, the term "unit" may be understood to refer to computing software, firmware, hardware, and/or various combinations thereof. It is noted that the units are exemplary. For example, one or more processors 150, 152a, 152b may operate pursuant to instructions stored on a storage medium 154, 156a, 156b to provide the functions as described for the units.

The units may also be combined, integrated, separated, and/or duplicated to support various applications. Also, a function described herein as being performed at a particular unit may be performed at one or more other units and/or by one or more other devices instead of and/or in addition to the function performed at the particular unit. Further, the units may be implemented across multiple devices and/or other components local or remote to one another, and the units may be moved from one device and added to another device, and/or may be included in both devices. In addition to a dedicated physical computing device, the word "server" may also mean a service daemon on a single computer, virtual computer, or shared physical computer, for example. The expression "at runtime" includes the state of a module at the time execution starts and also during execution by one or more processors of a computing device. Additionally, all combinations and permutations of the above described features, configurations, and examples may be utilized in conjunction with the invention.

What is claimed is:

1. A system for integrating a plurality of modules of computer code, the system comprising:
    a sandbox validator for receiving a first module of computer code and parsing the computer code of the first module in order to verify that the first module complies with one or more sandbox constraints, wherein the sandbox constraints include requiring that the first module does not include computer code attempting to access variables having a global scope and does not include computer code attempting to access information from outside the first module that is not directly passed to the first module;
    a computing device for executing the first module within a runtime environment; and
    a module integrator operating within the runtime environment and configured for:
        receiving a request from the first module to access a service provided by a second module of computer code available on the computing device;
        allowing the first module to access the service when the first module is authorized to access the service according to a service authorization table; and
        preventing the first module from accessing the service when the first module is not authorized to access the service according to the service authorization table;
    wherein the sandbox constraints further include requiring that loops within the first module terminate before a predetermined maximum time delay; and
    the module integrator is further for preventing a loop in the first module from continuing to run when the loop does not terminate before the predetermined maximum time delay.

2. The system of claim 1, wherein the module integrator is further configured for:
    allowing the first module to access the service by passing to the first module a pointer to an execution address of the service in the runtime environment when the first module is authorized to access the service according to the service authorization table; and
    preventing the first module from accessing the service by passing to the first module an invalid pointer as the execution address of the service when the first module is not authorized to access the service according to the service authorization table.

3. The system of claim 1, wherein, when parsing the computer code of the first module, the sandbox validator is further for ensuring when the first module requests access to the service provided by the second module that the first module correctly identifies itself with a module identifier associated with the first module.

4. The system of claim 1, wherein:
    the sandbox validator is further for automatically parsing each operation of the first module into one or more tokens and ensuring that a non-deterministic operation is checked with a policing function, the non-deterministic operation corresponding to an operation having at least one token listed on a non-deterministic list; and
    the module integrator is further for providing the policing function during execution of the first module to perform a runtime check of the non-deterministic operation, allowing execution of the non-deterministic operation when the runtime check determines the non-deterministic operation complies with the sandbox constraints, and preventing execution of the non-deterministic operation when the runtime check determines that the non-deterministic operation does not comply with the sandbox constraints.

5. The system of claim 1, wherein:
    the module integrator is further for receiving a service authorization policy associated with the first module and updating the service authorization table to include the service authorization policy for the first module; and
    the service authorization policy indicates at least one service provided by another module that the first module is authorized to access.

6. The system of claim 5, further comprising a service authorizer for automatically generating the service authorization policy for the first module according to a default system-wide service authorization policy.

7. The system of claim 5, further comprising a service authorizer for automatically generating the service authorization policy for the first module according to a module-specific authorization policy and an identifier of the first module.

8. The system of claim 1, wherein the sandbox validator is provided by a control server that is a separate device from the computing device.

9. The system of claim 1, wherein the computing device comprises one or more processors operable to provide functionality of the sandbox validator and the module integrator.

10. A method of integrating a plurality of modules of computer code, the method comprising:
    receiving a first module of computer code at a sandbox validator;
    parsing, by the sandbox validator, the computer code of the first module in order to verify that the first module complies with one or more sandbox constraints, wherein the sandbox constraints include requiring that the first module does not include computer code attempting to access variables having a global scope and does not include computer code attempting to access information from outside the first module that is not directly passed to the first module;
    executing the first module within a runtime environment on a computing device;
    receiving, by a module integrator operating within the runtime environment, a request from the first module to access a service provided by a second module of computer code available on the computing device;
    allowing, by the module integrator, the first module to access the service when the first module is authorized to access the service according to a service authorization table;

preventing, by the module integrator, the first module from accessing the service when the first module is not authorized to access the service according to the service authorization table; and preventing by the module integrator a loop in the first module from continuing to run when the loop does not terminate before a predetermined maximum time delay;

wherein the sandbox constraints further include requiring that loops within the first module terminate before the predetermined maximum time delay.

11. The method of claim 10, further comprising:

allowing the first module to access the service by passing from the module integrator to the first module a pointer to an execution address of the service in the runtime environment when the first module is authorized to access the service according to the service authorization table; and preventing the first module from accessing the service by passing from the module integrator to the first module an invalid pointer as the execution address of the service when the first module is not authorized to access the service according to the service authorization table.

12. The method of claim 10, further comprising ensuring by the sandbox validator when parsing the computer code of the first module that when the first module requests access to the service provided by the second module that the first module correctly identifies itself with a module identifier associated with the first module.

13. The method of claim 10, further comprising:

automatically parsing by the sandbox validator each operation of the first module into one or more tokens;

ensuring by the sandbox validator that a non-deterministic operation is checked with a policing function, the non-deterministic operation corresponding to an operation having at least one token listed on a non-deterministic list;

providing by the module integrator the policing function during execution of the first module to perform a runtime check of the non-deterministic operation;

allowing by the module integrator execution of the non-deterministic operation when the runtime check determines the non-deterministic operation complies with the sandbox constraints; and preventing by the module integrator execution of the non-deterministic operation when the runtime check determines that the non-deterministic operation does not comply with the sandbox constraints.

14. The method of claim 10, further comprising:

receiving a service authorization policy associated with the first module by the module integrator; and updating the service authorization table to include the service authorization policy for the first module;

wherein the service authorization policy indicates at least one service provided by another module that the first module is authorized to access.

15. The method of claim 14, further comprising automatically generating the service authorization policy for the first module by a service authorizer according to a module-specific authorization policy and an identifier of the first module.

16. The method of claim 10, wherein the runtime environment on the computing device is for executing JavaScript, and the first module and the second module are written in JavaScript.

17. A non-transitory computer readable storage medium comprising computer-executable instructions that when executed by one or more computers cause the one or more computers to perform the following method:

receiving a first module of computer code at a sandbox validator;

parsing, by the sandbox validator, the computer code of the first module in order to verify that the first module complies with one or more sandbox constraints, wherein the sandbox constraints include requiring that the first module does not include computer code attempting to access variables having a global scope and does not include computer code attempting to access information from outside the first module that is not directly passed to the first module;

executing the first module within a runtime environment on a computing device;

receiving, by a module integrator operating within the runtime environment, a request from the first module to access a service provided by a second module of computer code available on the computing device;

allowing, by the module integrator, the first module to access the service when the first module is authorized to access the service according to a service authorization table;

preventing, by the module integrator, the first module from accessing the service when the first module is not authorized to access the service according to the service authorization table; and preventing by the module integrator a loop in the first module from continuing to run when the loop does not terminate before a predetermined maximum time delay;

wherein the sandbox constraints further include requiring that loops within the first module terminate before the predetermined maximum time delay.

18. A system for integrating a plurality of modules of computer code for execution, the system comprising:

a control server having one or more processors operable to provide functionality of a sandbox validator;

wherein the sandbox validator is configured to receive a first module of computer code and to parse the computer code of the first module in order to verify that the first module complies with one or more sandbox constraints; and the sandbox constraints at least require that the first module does not include computer code attempting to access variables having a global scope and does not include computer code attempting to access information from outside the first module that is not directly passed to the first module; and a computing device coupled to the control server via a computer network;

wherein the computing device receives the first module from the control server via the computer network;

the computing device has one or more processors operable to execute the first module within a runtime environment;

the one or more processors of the computing device are further operable to provide functionality of a module integrator operating within the runtime environment;

the module integrator is configured to receive a request from the first module to access a service provided by a second module of computer code available on the computing device, allow the first module to access the service when the first module is authorized to access the service according to a service authorization table, and prevent the first module from accessing the service when the first module is not authorized to access the service according to the service authorization table;

the sandbox constraints further include requiring that loops within the first module terminate before a predetermined maximum time delay; and the module integrator is further configured to prevent a loop in the first module from continuing to run when the loop does not terminate before the predetermined maximum time delay.

\* \* \* \* \*